United States Patent [19]

Chillous

[11] Patent Number: 5,132,342
[45] Date of Patent: Jul. 21, 1992

[54] NONSEGREGATING BLENDS OF GLASS FIBERS AND POLYMER PELLETS

[75] Inventor: Sandra E. Chillous, Wilmington, Del.

[73] Assignee: E. I. Du Pont de Nemours and Company, Wilmington, Del.

[21] Appl. No.: 685,909

[22] Filed: Apr. 16, 1991

[51] Int. Cl.$^5$ .................. C08K 3/00; C08L 67/00
[52] U.S. Cl. .................. 523/513; 523/221; 524/494
[58] Field of Search .................. 523/221, 513; 524/494

[56] References Cited

U.S. PATENT DOCUMENTS

| | | | |
|---|---|---|---|
| 3,164,563 | 1/1965 | Maxwell et al. | 260/37 |
| 3,576,782 | 4/1971 | Molbert et al. | 260/41 |
| 3,644,271 | 2/1972 | Tulley | 260/41 |
| 3,655,850 | 4/1972 | Woodham et al. | 264/118 |
| 3,740,371 | 6/1973 | Segal | 260/40 |
| 3,822,177 | 7/1974 | Moked | 161/170 |
| 4,037,011 | 7/1977 | Hatton et al. | 428/294 |

Primary Examiner—Paul R. Michl
Assistant Examiner—U. K. Rajguru
Attorney, Agent, or Firm—Paul R. Steyermark

[57] ABSTRACT

A nonsegregating dry blend of 90–30 weight percent of elongated polymer pellets having an aspect ratio, $A_p$, of about 3–23 and a density of about 0.85–1.5 g/cm$^3$ with 10–70 weight percent of glass fibers having an aspect ratio, $A_g$, of 3.7–23, the $A_p/A_g$ ratio being about 0.4–1.6, especially 0.8–1.2, can be fed directly to melt-fabricating equipment without first melt-blending the polymer pellets with the glass fibers and fabricated into articles having a substantially uniform glass content.

9 Claims, 2 Drawing Sheets

NONSEGREGATING BLENDS OF GLASS FIBERS AND POLYMER PELLETS

BACKGROUND OF THE INVENTION

This invention relates to nonsegregating dry blends of glass fibers with polymer pellets, suitable for being directly fed to a melt-fabricating machine without being subjected to a preliminary melt-blending step, for producing uniformly loaded fiber-reinforced articles having good mechanical properties such as impact strength and stiffness.

It is customary to blend glass fibers with various polymers, for example, polyamides or polyesters, in order to improve the physical properties of the polymers, especially their toughness and stiffness. Normally, the polymer and the glass fibers are first melt-blended by any one of well known techniques, for example, in a mill, a mixer, or especially a twin-screw extruder. The polymer/glass fiber blend is then pelletized, and the pellets are fed to a melt-fabricating apparatus in which the final article is made. Such precompounding may be undesirable because the polymer is now melt-processed twice, rather then only once, thus being exposed to increased risk of heat degradation. Twin-screw extruder blending produces very uniform dispersions of glass fibers in polymer but has the additional disadvantage of causing a considerable amount of undesirable fiber breakage. A different technique is pultrusion, where a continuous glass fiber is pulled through molten polymer, or through a monomer, which is then subjected to in situ polymerization, or through an oligomer, which is then chain-extended.

If the preliminary melt-blending step is eliminated, and polymer pellets and glass fibers are introduced directly into the feed hopper of a melt-fabricating machine such as, e.g., an injection molding machine, a single screw extruder, or an injection blow-molding machine, the polymer pellets and the glass fibers tend to segregate from each other, because of their different densities, in the feed hopper, the feed throat, and/or the material conveying section of the melt-fabricating equipment and thus tend to form localized polymer aggregates and fiber aggregates. This leads to the production of nominally identical finished articles having different glass fiber levels. Such articles are said to have nonuniform (or variable) fiber loading. Finished articles with nonuniform fiber loading also have nonuniform performance. Nonuniform fiber loading generally causes point-to-point variations in physical properties within parts as well as part-to-part variations. In particular, this can cause inadequate toughening or stiffening at the locations of low fiber concentration and can produce rough, unsatisfactory appearance at the locations of high concentration on the surface of the article.

When a preliminary melt-blending step such as extrusion in a twin-screw machine or pultrusion is added, glass fibers become well dispersed in or coated with polymer. The extruded material or the polymer-coated fiber is cut into pellets that have a consistently uniform glass content. Those pellets can then be melt-fabricated into articles that also have a uniform glass content. While this result is desirable, a disadvantage of melt blending or pultrusion is the additional expense, in addition to the earlier mentioned disadvantages of fiber breakage, usually in an uncontrollable manner, and thermal degradation of the polymer.

It is, therefore, desirable to be able to provide substantially nonsegregating dry blends of glass fibers with particulate polymer material that can be fed directly to a melt-fabricating apparatus, especially to an injection-molding machine or a single screw extruder, without a need to first melt-blend these materials, and to melt-fabricate therefrom articles having a reasonably uniform glass fiber content. It further is desirable to provide nonsegregating, storage-stable dry blends of polymer material with glass fibers that can be transported and fed directly to melt-fabricating equipment.

SUMMARY OF THE INVENTION

According to the present invention, there is now provided a nonsegregating dry blend consisting of about 90–30 percent by weight of elongated polymer pellets having an aspect ratio, $A_p$, of about 3–23, the polymer pellet density being about 0.85–1.5 g/cm$^3$, and 10–70 percent by weight of glass fibers having an aspect ratio, $A_g$, of about 3.7–23; with a proviso that the $A_p/A_g$ ratio is about 0.4–1.6.

There also is provided a process for melt-fabricating articles from glass fiber-reinforced polymers, wherein a nonsegregating blend consisting essentially of about 90–30 percent by weight of elongated polymer pellets having an aspect ratio, $A_p$, of about 3–23, the polymer pellet density being about 0.85–1.5 g/cm$^3$, and 10–70 percent by weight of glass fibers having an aspect ratio, $A_g$, of about 3.7–23, $A_g/A_g$ being about 0.4–1.6, is directly fed to the feeding device of a melt-fabricating machine without first being subjected to a preliminary melt-blending step, and the resulting melt-fabricated articles have a substantially uniform glass fiber content.

BRIEF DESCRIPTION OF THE DRAWINGS

FIGS. 1 and 1A represent a rectangular parallelepiped.
FIGS. 2 and 2A represent a right cylinder.
FIGS. 3 and 3A represent an ellipsoid.
FIGS. 4 and 4A represent a "pillow" shape.

DETAILED DESCRIPTION OF THE INVENTION

Definitions: The term "dry blend" means a blend made by physically mixing the components without melting the polymer material.

The term "fiber" is used herein in its broadest sense to include both single and multifilament shaped structures such as, for example, bundles, threads, strands, rovings, and yarns, wherein the individual filaments are generally oriented lengthwise and may be twisted together, adhered to one another, or otherwise made to maintain the integrity of the shaped structure.

For the purpose of the claims, the term "glass fiber" or "glass fibers" is intended to mean the form of glass fibers which are to be blended with polymer pellets and either stored as a nonsegregating dry blend or fed directly to an injection molding machine, which may be glass fiber bundles, individual glass fibers, or individual filaments. When glass fiber bundles are employed, which usually is the case, either complete or partial separation of the bundles into individual fibers normally occurs in the injection molding process, so that the injection molded articles contain predominantly individual glass fibers, rather than fiber bundles, dispersed therein. However, for the purpose of the claims, the aspect ratio of the bundles, not of the individual glass fibers, is considered in those cases.

The term "aspect ratio" is the ratio of the characteristic large dimension of an article to its characteristic small dimension.

Figure 1A:
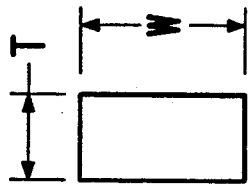

Glass fiber bundles normally have a rather flat, rectangular parallelepiped shape. Their aspect ratio can be expressed by equation (1):

$$A_g = \frac{L}{0.5(W + T)}, \quad (1)$$

where L is the length or characteristic large dimension; W is the width; and T is the thickness of the bundle. The characteristic small dimension is the average of its width and thickness, as shown in equation (1). A side view of such a pellet is shown schematically in FIG. 1, while an end view is shown in FIG. 1A.

Figure 2A:
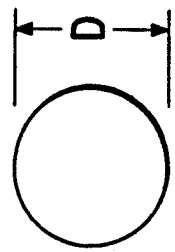
Figure 1:
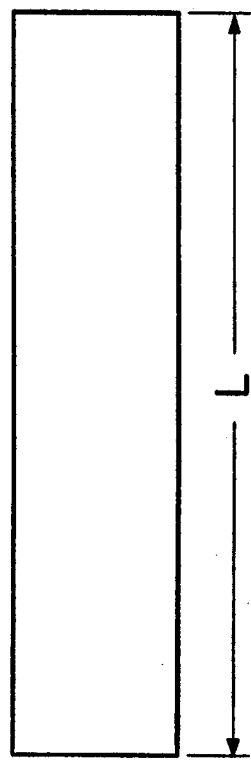
FIGS. 1 through 4A are schematic drawings of certain possible shapes of polymer pellets.
Figure 2:
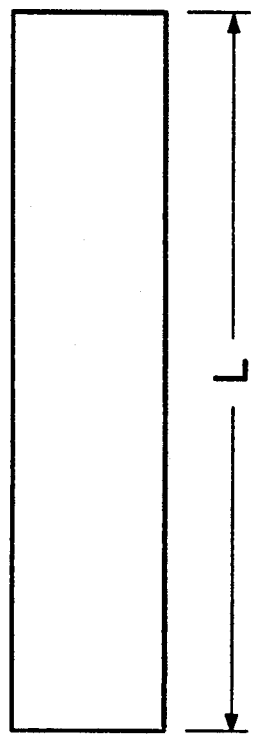
Figure 3A:
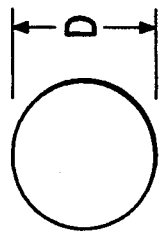
Figure 4A:
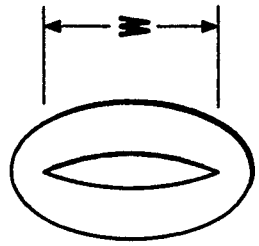
Figure 3:
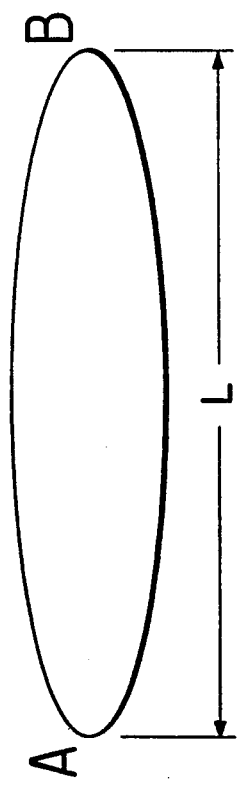
Figure 4:
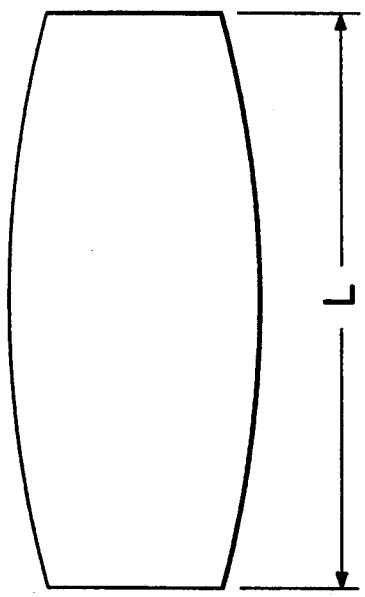

Polymer pellets can be made in various shapes, depending on the shape of the extruder die through which the polymer is extruded before being pelletized. Often, pellets will be rectangular parallelepipeds, such as shown in FIGS. 1 and 1A, in which case an equation like equation (1) will also apply. The pellets can be cylindrical. In the case of a right cylinder, its aspect ratio is equal to L/D, where L is its height or characteristic large dimension, and D is its diameter or characteristic small dimension. A right cylinder having such dimensions is shown schematically in FIGS. 2 and 2A, where FIG. 2 is a side view, and FIG. 2A is an end view. Two additional fairly common pellet shapes are ellipsoid and "pillow-shaped". For the former, the aspect ratio again is expressed as L/D, where the characteristic large dimension L is the distance between the poles (A and B) through the center, and the characteristic small dimension D is the diameter at the body's equator, as shown, respectively, in a side view and in an end view in FIGS. 3 and 3A. For the pillow shape (which looks somewhat like a tube of toothpaste, with both ends crimped), the aspect ratio is L/W, where the characteristic large dimension L is the length of the pellet, shown in FIG. 4, which is a side view; and the characteristic small dimension W is its width (the length of the crimp) shown in FIG. 4A, which is an end view of the pellet.

Glass fibers useful in the present invention encompass many varieties of commercially available glass fibers but especially include those normally used for the reinforcement of molded polymer articles. They usually have a thickness of about 1-50 micrometers, especially 5-20 micrometers, and are made of soft glass. Borosilicate glass would be equally suitable for this purpose, except that its much higher price normally would not justify the use of such fibers.

Suitable glass fibers are available from many sources, including Pittsburgh Plate Glass Co. (PPG) and Owens-Corning Fiberglass Co. (OCF). The glass fibers may contain a size which improves adhesion to polymer. The size may vary with particular glass type or manufacturer but often contains various organotitanates and organosilanes. Representative organotitanates include, for example, tetraisopropyl di(dioctylphosphito) titanate; titanium dimethacrylate oxyacetate; isopropyl diisostearyl methacryl titanate; isopropyl tricumylphenyl titanate; and isopropyl tri(dioctylpyrophosphato) titanate. Representative organosilanes include, for example, 3-aminopropyltriethoxysilane, vinyl triethoxysilane, and 3-chloropropyltrimethoxysilane.

Glass fiber bundles have uniform lengths ranging from about 0.3 cm to about 2 cm. They usually contain from a few hundred to about 2000, especially about 600-1000 of individual glass filaments. The aspect ratio of commercially available reinforcement grade glass fiber bundles ranges from about 4.5 to 12 and their bulk density is about 0.5 g/cm$^3$.

The polymers suitable in this invention must be nontacky, that is, not subject to agglomeration or massing upon stationary contact under pressure. Typical polymers suitable in this invention are polyolefins such as, for example, polyethylene and polypropylene; polyamides such as, for example, poly(hexamethylene adipamide), poly(epsilon-caprolactam), copolymers of hexamethylene adipamide with epsilon-caprolactam, and poly(omega-laurolactam); polyesters such as, for example, poly(ethylene terephthalate) and poly(tetramethylene terephthalate); polyvinyl chloride; polycarbonates; acrylonitrile/butadiene/styrene terpolymers; polyphenylene oxides; and ethylene/vinyl alcohol copolymers. All the above polymers, as well as many other polymers, have bulk densities within the recited range of about 0.85-1.5 g/cm$^3$, so that pellets of such polymers would satisfy this density requirement. It has to be kept in mind, however, that pellets of foamed polymers may also be suitable in this invention where the density of unfoamed polymer exceeds the upper limit of this range, but the density of foamed polymer pellets is within this range. Foamed polymer pellets can be made by extrusion from unfoamed polymer using known techniques. Foamed pellet density can be readily determined by weighing a quantity of foamed pellets and then determining their volume.

Selection of polymer and of the type and dimensions of glass fibers in the fabrication of fiber-reinforced polymer articles is normally primarily based on the cost and desired performance of the finished part. This selection is normally made by the part designer and is not within the scope of the present invention.

When polymer pellets blend well with glass fibers, a given dry blend can be continuously fed to an injection molding machine, which will in the ideal situation repeatedly produce in the same mold glass fiber-reinforced articles having the same shape and weight. Since the shape of the article, being dependent on the shape of the mold, will not vary, any variations of the article's weight can be ascribed to different levels of glass fiber loading. The degree of weight variability in a statistically valid number of articles made from a given blend of polymer pellets with glass fibers can be calculated from the following equation (2):

$$c_{var} = \frac{\left[\frac{\text{sum }(w_i - W)^2}{(n-1)}\right]}{W} \times 100\% \quad (2)$$

where
n = number of runs;
wj = weight of the jth article;
W = average weight of n test articles
sum( ) = sum from j=1 to j=n of the quantity.

Naturally, it is desired to have a $c_{var}$ as small as possible, especially less than 1. Obviously, there also must be present other factors that influence the result, possibly, polymer density, glass fiber density, integrity of glass fiber bundles, dimensions of the injection molding machine and of its feeding device. Further, the results will also depend on the thoroughness of blending the glass fibers with the polymer pellets prior to introducing the blend into the feeding device. Those blends can be made in any convenient manner, for example, by mechanical stirring, manual mixing, or tumbling.

This invention is now illustrated by ninety representative examples, where all parts, proportions, and percentages are by weight. The complete series of experiments is summarized in Table I, below, where $L_g$ = glass fiber length;
$W_g$ = glass fiber width;
$T_g$ = glass fiber thickness;
$L_p$ = polymer pellet length;
$W_p$ = polymer pellet width;
$T_p$ = polymer pellet thickness; and
$c_{var}$ has been calculated according to equation (2), above.

The uniformity of glass fiber loading was determined by injection molding test bars having the size of 12.7×1.27×0.3175 cm. Typically, 40 test bars of each blend were weighed on an analytical balance, and the coefficient of variation for each blend was determined according to equation (2), above. The polymer pellet and glass fiber dimensions and coefficients of variation for all the runs are presented below in Table I. All the experimental data and measurements obtained in a system other than SI have been converted to SI units.

In run 1, the polymer was a Du Pont Co. unextracted nylon 6 having a relative viscosity (RV) of 75. "Unextracted" means that residual, unpolymerized epsilon-caprolactam was left in the polymer. All RV data were determined according to ASTM D789.

In Examples 2, 6, 9, 13, and 15, the polymer was an extracted nylon 6 manufactured by Companhia Bahiana de Fios Industriais (Brazil).

In Example 3, the polymer was an extracted nylon 6 manufactured by BASF.

In Examples 4, 7, 10, 14, and 16, the polymer was an extracted nylon 6 of Allied-Signal Corp. having an RV of 72.

In Examples 5, 8, 11, and 12, the polymer was a Du Pont Co. nylon 66 having an RV of 52.

In all the remaining examples, the polymer was a Du Pont Co. poly(ethylene terephthalate) having acid end groups neutralized with sodium and a number average molecular weight of 16,000.

The densities of all the polymer pellets used in the examples were within the range of 0.85–1.5 g/cm³.

The amount of glass (%) in the examples was as follows:

| Examples | Amount of Glass |
|---|---|
| 1–16 | 50 |
| 17–36 | 45 |
| 37–38 | 40 |
| 39–90 | 45 |

A typical operating procedure was as follows:

Polymer was melted in a single screw extruder and extruded into a strand through a 4.762 mm diameter circular die. The strand was cut with a rotary cutter into pellets having the desired dimensions. Some low aspect ratio polymer pellets were commercial grade and were used as received from the suppliers. Glass fibers used for molding were obtained by chopping commercial continuous roving, type OCF-473 from Owens-Corning Glass Company, into bundles having the dimensions shown in Table I, below.

Equal weights (1700 g each) of polymer pellets and glass fibers were placed in a 38 L plastic bag, which was inflated with nitrogen and sealed. The bag was shaken manually for one minute. The blend was then removed and dried at 100° C. and 133 Pa for 20 hours. The blend was placed in the feed hopper of a nominal 6-ounce (177 ml) HPM injection molding machine having a 7 cm diameter feed throat and a 4.4 cm diameter mixing screw. The machine temperature profile for the nylon compositions was, in the order Feed/Center 1/Center 2/Injection Nozzle/Mold, 245/270/275/275/90° C. For the polyester compositions, it was 260/270/280/295/110° C. The injection molding machine was operated at 40-second cycle times to produce test bars. The coefficient of variation, $c_{var}$, was determined for these bars according to equation (2), above.

As a general comment, the nature of the polymer and the level of glass loading should not affect the coefficients of variation. Further, the design of the injection molding screw should not affect the coefficient of variation. In Examples 1–11, the machine was equipped with a general purpose screw, while in the remaining examples a mixing screw was used.

The experimental data are presented below. The individual aspect ratios are not given but can be calculated from the tabulated dimension data. For example, in Example 4, $A_g$=11.67 and $A_p$=1.21; in Example 7, $A_g$=11.67 and $A_p$=4.5; in Example 51, $A_g$=11.67 and $A_p$=1.31; and in Example 74, $A_g$=11.67 and $A_p$=13.8.

TABLE I

| Ex. No. | Lg mm | Wg mm | Tg mm | Lp mm | Wp mm | Tp mm | $c_{var}$ |
|---|---|---|---|---|---|---|---|
| 1 | 13.6 | 2.2 | 0.13 | 2.9 | 2.1 | 0.4 | 2.60 |
| 2 | 13.6 | 2.2 | 0.13 | 2.0 | 1.6 | 1.6 | 2.50 |
| 3 | 13.6 | 2.2 | 0.13 | 3.0 | 2.2 | 2.1 | 2.20 |
| 4 | 13.6 | 2.2 | 0.13 | 2.3 | 2.2 | 1.8 | 1.60 |
| 5 | 13.6 | 2.2 | 0.13 | 2.8 | 2.6 | 2.2 | 2.10 |
| 6 | 13.6 | 2.2 | 0.13 | 7.9 | 2.0 | 2.0 | 1.40 |
| 7 | 13.6 | 2.2 | 0.13 | 8.1 | 1.8 | 1.8 | 0.62 |
| 8 | 13.6 | 2.2 | 0.13 | 8.1 | 1.8 | 1.8 | 0.37 |
| 9 | 4.9 | 1.8 | 0.18 | 7.9 | 2.0 | 2.0 | 0.87 |
| 10 | 4.9 | 1.8 | 0.18 | 8.1 | 1.8 | 1.8 | 1.12 |
| 11 | 4.9 | 1.8 | 0.18 | 8.1 | 1.8 | 1.8 | 0.87 |
| 12 | 13.6 | 2.2 | 0.13 | 2.8 | 2.6 | 2.2 | 2.60 |
| 13 | 13.6 | 2.2 | 0.13 | 2.0 | 1.6 | 1.6 | 2.95 |
| 14 | 13.6 | 2.2 | 0.13 | 2.3 | 2.2 | 1.8 | 1.88 |
| 15 | 13.6 | 2.2 | 0.13 | 7.9 | 2.0 | 1.8 | 1.86 |
| 16 | 13.6 | 2.2 | 0.13 | 8.1 | 2.0 | 1.8 | 1.73 |
| 17 | 13.6 | 2.2 | 0.13 | 4.1 | 3.5 | 2.3 | 0.68 |
| 18 | 13.6 | 2.2 | 0.13 | 4.1 | 3.5 | 2.3 | 1.49 |
| 19 | 13.6 | 2.2 | 0.13 | 4.1 | 3.5 | 2.3 | 1.38 |
| 20 | 13.6 | 2.2 | 0.13 | 4.1 | 3.5 | 2.3 | 1.92 |
| 21 | 13.6 | 2.2 | 0.13 | 4.1 | 3.5 | 2.3 | 1.14 |
| 22 | 4.9 | 1.8 | 0.18 | 4.1 | 3.5 | 2.3 | 1.26 |
| 23 | 9.5 | 2.2 | 0.13 | 4.1 | 3.5 | 2.3 | 1.01 |
| 24 | 4.9 | 1.8 | 0.18 | 3.2 | 2.1 | 1.5 | 0.45 |
| 25 | 9.5 | 2.2 | 0.13 | 3.2 | 2.1 | 1.5 | 0.92 |
| 26 | 13.6 | 2.2 | 0.13 | 3.2 | 2.1 | 1.5 | 1.72 |
| 27 | 13.6 | 2.2 | 0.13 | 3.0 | 1.9 | 1.4 | 0.58 |
| 28 | 13.6 | 2.2 | 0.13 | 3.2 | 1.9 | 1.4 | 1.74 |
| 29 | 4.9 | 1.8 | 0.18 | 7.9 | 2.0 | 1.5 | 0.34 |
| 30 | 9.5 | 2.2 | 0.13 | 7.9 | 2.0 | 1.5 | 0.56 |
| 31 | 13.6 | 2.2 | 0.13 | 7.9 | 2.0 | 1.5 | 0.80 |
| 32 | 13.6 | 2.2 | 0.13 | 4.1 | 3.5 | 2.3 | 1.83 |
| 33 | 13.6 | 2.2 | 0.13 | 4.1 | 3.5 | 2.3 | 1.72 |
| 34 | 13.6 | 2.2 | 0.13 | 3.5 | 3.0 | 2.2 | 1.04 |
| 35 | 13.6 | 2.2 | 0.13 | 3.5 | 3.0 | 2.2 | 1.51 |
| 36 | 13.6 | 2.2 | 0.13 | 6.7 | 2.3 | 1.5 | 1.48 |
| 37 | 4.9 | 1.8 | 0.18 | 6.7 | 2.3 | 1.5 | 0.47 |
| 38 | 13.6 | 2.2 | 0.13 | 6.7 | 2.3 | 1.5 | 1.17 |
| 39 | 13.6 | 2.2 | 0.13 | 6.7 | 2.3 | 1.5 | 0.79 |
| 40 | 4.9 | 1.8 | 0.18 | 6.7 | 2.3 | 1.5 | 0.68 |

TABLE I-continued

| Ex. No. | Lg mm | Wg mm | Tg mm | Lp mm | Wp mm | Tp mm | $c_{var}$ |
|---|---|---|---|---|---|---|---|
| 41 | 4.9 | 1.8 | 0.18 | 10.4 | 2.0 | 1.3 | 1.83 |
| 42 | 13.6 | 2.2 | 0.13 | 10.4 | 2.0 | 1.3 | 1.70 |
| 43 | 4.8 | 1.8 | 0.18 | 4.3 | 3.8 | 2.8 | 1.80 |
| 44 | 4.8 | 1.8 | 0.18 | 4.0 | 2.5 | 1.8 | 0.67 |
| 45 | 4.8 | 1.8 | 0.18 | 6.6 | 4.1 | 2.5 | 0.78 |
| 46 | 4.8 | 1.8 | 0.18 | 6.6 | 2.0 | 1.5 | 0.67 |
| 47 | 4.9 | 1.8 | 0.18 | 13.5 | 3.6 | 2.3 | 1.36 |
| 48 | 3.5 | 1.8 | 0.18 | 13.0 | 2.4 | 1.9 | 1.69 |
| 49 | 3.5 | 1.4 | 0.05 | 4.3 | 3.8 | 2.8 | 0.90 |
| 50 | 13.6 | 1.4 | 0.05 | 4.0 | 2.5 | 1.8 | 0.68 |
| 51 | 13.6 | 2.2 | 0.13 | 4.3 | 2.5 | 2.8 | 1.57 |
| 52 | 13.6 | 2.2 | 0.13 | 4.0 | 2.5 | 1.8 | 0.67 |
| 53 | 13.6 | 2.2 | 0.13 | 6.6 | 4.1 | 2.5 | 0.78 |
| 54 | 13.6 | 2.2 | 0.13 | 6.6 | 2.0 | 1.5 | 0.56 |
| 55 | 13.6 | 2.2 | 0.13 | 13.5 | 3.6 | 2.3 | 1.35 |
| 56 | 13.6 | 2.2 | 0.13 | 13.0 | 2.4 | 1.9 | 1.12 |
| 57 | 3.5 | 1.4 | 0.05 | 6.6 | 4.1 | 2.5 | 1.01 |
| 58 | 3.5 | 1.4 | 0.05 | 6.6 | 2.0 | 1.5 | 1.02 |
| 59 | 6.6 | 2.2 | 0.13 | 4.3 | 3.8 | 2.8 | 0.90 |
| 60 | 6.6 | 2.2 | 0.13 | 4.0 | 2.5 | 1.8 | 0.56 |
| 61 | 6.6 | 2.2 | 0.13 | 6.6 | 4.1 | 2.5 | 1.23 |
| 62 | 6.6 | 2.2 | 0.13 | 6.6 | 2.0 | 1.5 | 1.35 |
| 63 | 6.6 | 2.2 | 0.13 | 13.5 | 3.6 | 2.3 | 0.67 |
| 64 | 6.6 | 2.2 | 0.13 | 13.0 | 2.4 | 1.9 | 0.67 |
| 65 | 3.5 | 1.4 | 0.05 | 13.5 | 3.6 | 2.3 | 0.79 |
| 66 | 3.5 | 1.4 | 0.05 | 13.0 | 3.6 | 1.9 | 1.83 |
| 67 | 4.9 | 1.8 | 0.18 | 24.1 | 3.6 | 2.3 | 1.82 |
| 68 | 4.9 | 1.8 | 0.18 | 26.2 | 2.3 | 1.5 | 1.90 |
| 69 | 3.5 | 1.4 | 0.05 | 24.1 | 3.6 | 2.3 | 2.59 |
| 70 | 3.5 | 1.4 | 0.05 | 26.2 | 2.3 | 1.5 | 1.00 |
| 71 | 6.6 | 2.2 | 0.13 | 24.1 | 3.6 | 2.3 | 0.90 |
| 72 | 6.6 | 2.2 | 0.13 | 26.2 | 2.3 | 1.5 | 0.67 |
| 73 | 13.6 | 2.2 | 0.13 | 24.1 | 3.6 | 2.3 | 1.80 |
| 74 | 13.6 | 2.2 | 0.13 | 26.2 | 2.3 | 1.5 | 0.67 |
| 75 | 26.2 | 2.2 | 0.13 | 24.1 | 3.6 | 2.3 | 1.00 |
| 76 | 13.6 | 2.2 | 0.13 | 4.0 | 2.5 | 1.5 | 0.67 |
| 77 | 13.6 | 2.2 | 0.13 | 6.6 | 4.1 | 2.5 | 1.56 |
| 78 | 13.6 | 2.2 | 0.13 | 6.5 | 1.8 | 1.2 | 0.56 |
| 79 | 6.6 | 2.2 | 0.13 | 4.3 | 3.8 | 2.8 | 0.56 |
| 80 | 6.6 | 2.2 | 0.13 | 6.5 | 1.8 | 1.2 | 0.56 |
| 81 | 6.6 | 2.2 | 0.13 | 13.5 | 3.6 | 2.3 | 0.79 |
| 82 | 6.6 | 2.2 | 0.13 | 13.0 | 2.4 | 1.9 | 0.78 |
| 83 | 13.6 | 2.2 | 0.13 | 6.6 | 4.1 | 2.5 | 1.69 |
| 84 | 13.6 | 2.2 | 0.13 | 6.5 | 1.8 | 1.2 | 0.89 |
| 85 | 6.6 | 2.2 | 0.13 | 4.3 | 3.6 | 2.8 | 0.68 |
| 86 | 6.6 | 2.2 | 0.13 | 6.5 | 1.8 | 1.2 | 0.45 |
| 87 | 6.6 | 2.2 | 0.13 | 13.5 | 3.6 | 2.3 | 0.90 |
| 88 | 6.6 | 2.2 | 0.13 | 13.0 | 2.4 | 1.8 | 0.56 |
| 89 | 4.9 | 1.8 | 0.18 | 6.5 | 1.8 | 1.2 | 0.78 |
| 90 | 4.9 | 1.8 | 0.18 | 6.6 | 2.0 | 1.5 | 0.68 |

The results of the above examples can be analyzed statistically, as follows:

The examples were divided into two groups: those corresponding to the present invention (Group I) and those outside the present invention (Group II). The criteria for group I are: (1) that $A_p$ is at least 3, and (2) that $A_p/A_g = 0.4-1.6$.

When condition (2) is satisfied, the deviation of $A_p/A_g$ from 1.0 (hereinafter, tolerance) is ±60%. Six different tolerance levels, namely, 10, 20, 30, 40, 50, and 60%, were studied. For each case, the number of data points, maximum coefficient of variation (Max $c_{var}$) in the group, minimum coefficient of variation (Min $c_{var}$) in the group, average coefficient of variation (Avg $c_{var}$) in the group, and standard deviation (Std dev) of coefficient of variation values for each group were calculated. The results are shown in Tables II and III, below:

TABLE II

| | (GROUP I) | | | | | |
|---|---|---|---|---|---|---|
| Tolerance, % | 10 | 20 | 30 | 40 | 50 | 60 |
| No. of examples | 7 | 13 | 25 | 26 | 30 | 30 |
| Max $c_{var}$ | 1.36 | 1.36 | 1.83 | 1.83 | 1.83 | 1.83 |
| Min $c_{var}$ | 0.56 | 0.34 | 0.34 | 0.34 | 0.34 | 0.34 |
| Avg $c_{var}$ | 0.88 | 0.79 | 0.91 | 0.93 | 0.95 | 0.95 |
| Std dev | 0.254 | 0.240 | 0.435 | 0.435 | 0.435 | 0.435 |

TABLE III

| | (GROUP II) | | | | | |
|---|---|---|---|---|---|---|
| Tolerance, % | 10 | 20 | 30 | 40 | 50 | 60 |
| No. of example | 83 | 77 | 65 | 64 | 60 | 60 |
| Max $c_{var}$ | 2.95 | 2.95 | 2.95 | 2.95 | 2.95 | 2.95 |
| Min $c_{var}$ | 0.34 | 0.37 | 0.37 | 0.37 | 0.37 | 0.37 |
| Avg $c_{var}$ | 1.21 | 1.25 | 1.29 | 1.29 | 1.30 | 1.30 |
| Std dev | 0.608 | 0.612 | 0.616 | 0.620 | 0.629 | 0.629 |

The following conclusions can be drawn from the above data:

A. Using average and maximum $c_{var}$ as indications of blend stability, for each tolerance level, the blends of group I were less segregating than the blends of group II.

B. The lowest tendency of the blends to segregate was shown for the lower tolerance values; the improvement was substantial when the tolerance decreased from 40% to 20%.

EXAMPLE 91

This example shows that glass fiber-reinforced articles injection molded from dry blends of glass fibers and polymer pellets without first melt blending them together have comparable mechanical properties, whether or not those dry blends satisfy the requirements of this invention. Further, their mechanical properties are comparable to those of commercial pultruded samples made of the same materials. However, in the case of dry blends of the present invention, the scatter of the values was much lower, as shown for the flexural modulus, so that in practice more injection molded articles had flexural modulus values close to the average value. Together with the improvement of the feeding step, as explained earlier, this invention results in products having comparable uniformity and properties at a cost that is much lower than that of articles made from pellets of pultruded polymer-coated glass fibers.

In all injection molded samples whether those made from the dry blends according to the present invention or those made from pultruded pellets, the initial glass fiber length was 1.25 cm. The results are summarized in the following Table IV, where the Example No. refers to Table I. The physical properties of the samples were determined according to the following standards:
tensile strength at break, ASTM D638;
elongation at break, ASTM D638;
flexural modulus, ASTM D790; and
notched Izod, ASTM D256.

Each determination was made in five replicates. The figures in parentheses in Table IV are calculated standard deviations.

TABLE IV

| Ex. No. | Polymer | Ap/Ag | Tens. Str. MPa | Elong. % | Flex Mod. MPa | Notch Izod J/cm |
|---|---|---|---|---|---|---|
| 7 | Nylon 6 | 0.39 | 221 | 2.3 | 14,243 (524) | 2.9 |
| 4 | Nylon 6 | 0.08 | 213 | 2.1 | 14,076 (876) | 3.1 |
|  | Verton ® RF-700-EM[1] |  | 255 | 2.6 | 14,992 (421) | 2.72 |
| 31 | polyethylene terephthalate | 0.39 | 165 | 1.5 | 13,790 | 2.1 |
|  | Celstran ® PETG40[2] |  | 172 | 1.4 | 14,479 | 2.83 |
|  | Celstran ® PETG50[3] |  | 172 | 1.1 | 16,547 | 3.31 |

[1]Commercial pultruded product of ICI based on nylon 6 containing 50% of glass fibers
[2]Commercial pultruded product of Celanese Corporation based on polyethylene terephthalate and containing 40% of glass fibers
[3]Commercial pultruded product of Celanese Corporation based on polyethylene terephthalate and containing 50% of glass fibers

I claim:

1. In a process for melt-fabricating articles from glass fiber-reinforced polymers, the improvement of directly feeding to the melt-fabricating equipment a substantially nonsegregating dry blend consisting of about 90-30 percent by weight of elongated polymer pellets having an aspect ratio, $A_p$, of about 3-23, the polymer pellet density being about 0.85-1.5 g/cm$^3$, and 10-70 percent by weight of glass fibers having an aspect ratio, $A_g$, of about 3.7-23, the ratio $A_p/A_g$ being about 0.4-1.6, without subjecting polymer pellets and glass fibers to a preliminary melt-blending step, and recovering melt-fabricated articles having a substantially uniform glass content.

2. A process of claim 1 wherein the ratio $A_p/A_g$ is about 0.8-1.2.

3. A process of claim 2 which is an injection molding process.

4. A process of claim 2 which is a single screw extrusion process.

5. A process of claim 2 wherein the polymer is a polyester.

6. A process of claim 5 wherein the polyester is poly(ethylene terephthalate).

7. A process of claim 1 wherein the polymer is a polyamide.

8. A process of claim 7 wherein the polyamide is nylon 66.

9. A process of claim 7 wherein the polyamide is nylon 6.

* * * * *